United States Patent [19]
Zhadanov et al.

[11] Patent Number: 5,730,178
[45] Date of Patent: Mar. 24, 1998

[54] DEVICE FOR INTRODUCING SUBSTANCES INTO WATER

[76] Inventors: Eli Zhadanov; Sam Zhadanov, both of 2944 W. 5th Str. Apt.20J., Brooklyn, N.Y. 11224

[21] Appl. No.: 675,959

[22] Filed: Jul. 5, 1996

[51] Int. Cl.$^6$ .................................................. B01D 11/02
[52] U.S. Cl. ........................ 137/268; 422/282; 422/283
[58] Field of Search ........................ 137/268; 422/263, 422/264, 282, 283; 239/310

[56] References Cited

U.S. PATENT DOCUMENTS

| | | |
|---|---|---|
| 3,195,558 | 7/1965 | Klueber et al. ................. 137/268 |
| 3,455,054 | 7/1969 | Tibbals, Jr. ................. 137/268 X |
| 5,507,945 | 4/1996 | Hansen ........................ 137/268 X |

*Primary Examiner*—Kevin Lee
*Attorney, Agent, or Firm*—Ilya Zborovsky

[57] ABSTRACT

A device for introducing substances into water in bathing, showering and similar systems has a body, a water inlet passage, a water outlet passage, an element for connecting the body to a container which accommodates a substance to be introduced to water, an opening communicating the water inlet passage with an interior of the container so that water flows into the interior of the container from the water inlet passage to be enriched with a substance, an opening communicating the interior of the container with the water outlet passage so that the water enriched with the substance can flow from the interior of the container into the water outlet passage, and a resistance between the water inlet passage and the water outlet passage so that a pressure in the water outlet passage is lower than a pressure in the water inlet passage and therefore a suction is created in the water outlet passage so as to aspirate the water enriched with the substance from the interior of the container into the water outlet passage.

3 Claims, 1 Drawing Sheet

DEVICE FOR INTRODUCING SUBSTANCES INTO WATER

BACKGROUND OF THE INVENTION

The present invention relates to a device for introducing substances into water, for example in systems for bathing, showering, and the like.

In the systems for bathing, showering and the like water is supplied from a water source to an outlet element of the system to discharge water into a bath, through a shower head, etc. It has been determined that it is desirable to enrich water with minerals, washing substances, medicinal substances etc. It is therefore desirable to provide corresponding devices for adding such substances to a flowing water for bathing, showering, etc.

SUMMARY OF THE INVENTION

Accordingly, it is an object of the present invention to provide a device for adding substances to a flowing water for bathing, showering, etc.

In keeping with these objects and with others which will become apparent hereinafter, one feature of the present invention resides, briefly stated, in a device for adding substance for bathing, showering, and the like, which has means forming a water inlet; means forming a water outlet communicating with the water inlet forming means; means for connecting to a substance containing container; means for supplying water from the water inlet means into the container; means for withdrawing water enriched with the substance from the container into the water outlet means; and means forming a resistance between the water inlet and the water outlet means so that a negative pressure is produced in the water outlet means to aspirate the water enriched with the substance from the container.

When the device is designed in accordance with the present invention, water flows into the water inlet means, then into the container, in the container it is enriched with the substance, then it is withdrawn from the container and flows into the water outlet means under the action of a negative pressure, and finally issues from the water outlet means being enriched with the substance.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
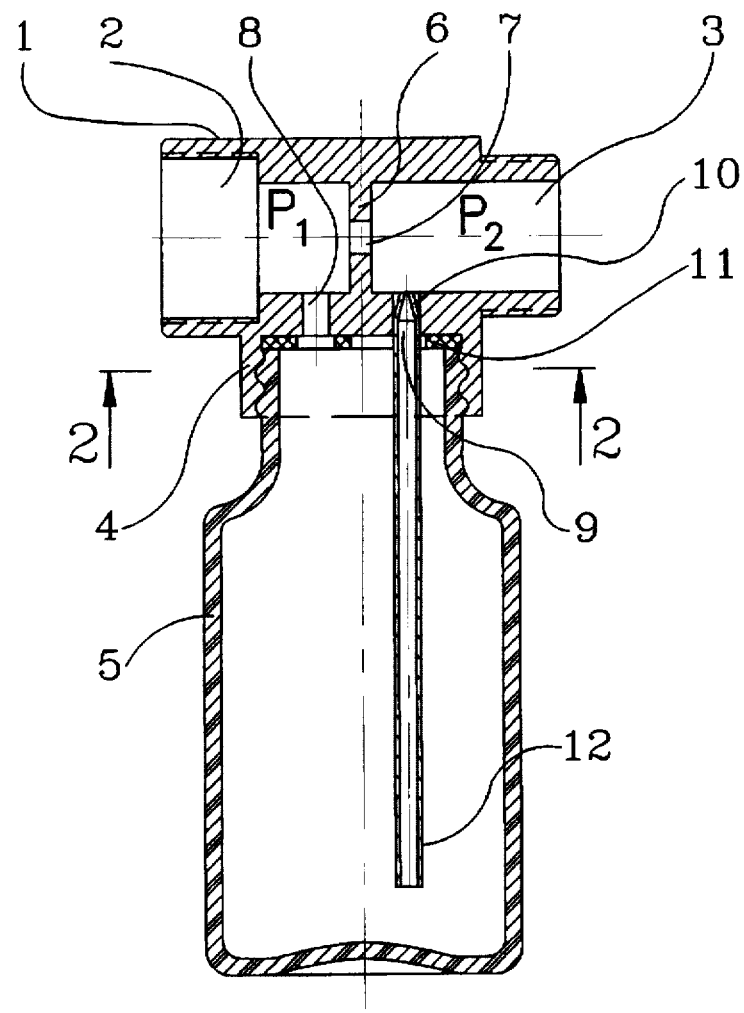
FIG. 1 is a view schematically showing a device for introducing substances into water in accordance with the present invention in a cross-section.
Figure 2:
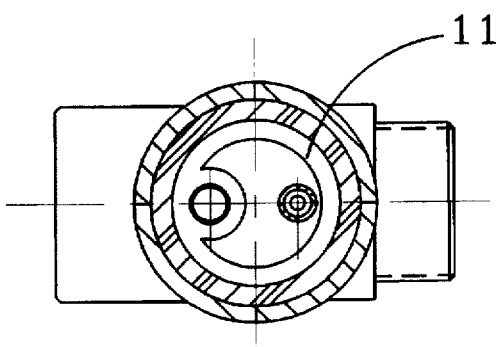
FIG. 2 is a view showing the device in direction of the arrow 2.

A device for introducing substances into water for bathing, showering and the like includes a body which is identified as a whole with reference numeral 1. The body has a water inlet passage identified with the reference numeral 2. In the area close to the end of the water inlet passage 2, a connecting formation (for example the thread) is provided so that the body 1 can be attached to an outlet pipe of a bathing system, a showering system and the like. The device further has a water outlet which is identified with reference numeral 3. A flange 4 extends substantially perpendicular to the axis of the water inlet passage 2 and water outlet passage 3 and has an inner formation, for example a thread for connecting a container 5 provided with a corresponding thread. A wall 6 separates the passages 2,3 from one another.

The container 5 accommodates usually a substance to be introduced into water. The substance can be in form of a soap flowing from the container, tablets which are slowly dissolved in water, etc. The body 1 is provided with an opening 8 communicating the water inlet passage 2 with the interior of the container 5, and with a further opening 9 communicating the interior of the container 5 with the water outlet passage 3. The opening 9 is provided with a narrowing portion 10 formed for example as a conical portion. The connection of the container 5 with the body 1 is sealed by a seal 11 located between the upper end of the neck of the container 5 and the lower surface of the receiving opening for the neck.

In accordance with an important new feature of the present invention, a resistance is provided between the water inlet passage 2 and the water outlet passage 3. The resistance 7 is formed as an opening formed in the wall 6, communicating the water inlet passage 2 with the water outlet passage 3 and having a cross-section which is smaller than the cross-section of the passages, so as to form the resistance. An outlet element such as for example a shower head, a nut and the like is mounted on the end portion of the water outlet passage 3, for example by threading.

The device operates in the following manner:

Water flows into the water inlet passage 2 through a corresponding pipe and then enters through the opening 8 in the interior of the container 5. A substance located in the container is entrained by the water, and then water enriched with the substance flows through the opening 9 into the water outlet passage 3. The flow from the interior of the container 5 into the water outlet passage 3 is performed under the action of a negative pressure or ratification formed by the resistance 7, so that the pressure P2 in the water outlet passage 3 is lower the pressure P1 in the water inlet passage 2 and in the container 5. Under the action of the above mentioned pressure deferential, the suction of the water enriched with the substance from the interior of the container 5 into the water outlet passage 3 is provided through the tube 12. The conical portion 10 of the opening 9 provides a water speed increase, so that the water with the substance is introduced from the container into the water outlet passage 3 in form of a high speed jet.

It will be understood that each of the elements described above, or two or more together, may also find a useful application in other types of constructions differing from the types described above.

While the invention has been illustrated and described as embodied in device for introducing substances into water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for introducing substances into water in showering and similar systems, the device comprising; a body; means forming a water inlet passage; means forming a water outlet passage; means for connecting said body to a container which accomodates a substance to be introduced into water; means for communicating said water inlet passage with an interior of the container so that water flows into the interior of the container from said water inlet passage to be enriched with the substance, said means for communicating said water inlet passage with an interior of the container including a first opening communicating said water inlet passage with an interior of the container; means forming a resistance between said water inlet passage and said water outlet passage so that a pressure in said water outlet passage is lower than a pressure in said water inlet passage and therefore a suction is produced in said water outlet passage; and means for communicating the interior of the container with said water outlet passage so that the water enriched with the substance flows from the interior of the container into said water outlet passage, said means communicating the interior of the container with said water outlet passage including a structure which is formed so as to provide a speed increase of the water enriched with the substance so as to introduce the water enriched with the substance from the interior of the container into said water outlet passage with said lower pressure as a high speed jet, said means for communicating the interior of the container with said water outlet passage being formed as a second opening, while said structure of said means for communicating the interior of the container with said water outlet passage is formed as a portion of said second opening, which portion conically narrows toward said water outlet passage with the tower pressure, so that in a region of said conically narrowing portion the water with the substance which flows from the interior of the container through said second opening increases its speed and is discharged into said water outlet passage with the lower pressure in form of a high speed jet.

2. A device as defined in claim 1, wherein said resistance is formed as an opening communicating said water inlet passage with said water outlet and having a cross-section which is smaller than a cross-section of said water inlet passage and said water outlet passage.

3. A device as defined in claim 2, wherein said water inlet passage, said water outlet passage, and said opening communicating said water inlet passage and said water outlet passage with one another are coaxial with one another.

* * * * *